United States Patent
Feng et al.

(10) Patent No.: US 11,615,046 B2
(45) Date of Patent: Mar. 28, 2023

(54) BUS COMMUNICATION SIGNAL CONVERSION METHOD AND DEVICE, MEDIUM, AND NUMERICAL CONTROL MACHINE TOOL CONTROL EQUIPMENT

(71) Applicants: HAN'S LASER TECHNOLOGY INDUSTRY GROUP CO., LTD., Guangdong (CN); SHENZHEN HAN'S SMART CONTROL TECHNOLOGY CO., LTD., Guangdong (CN)

(72) Inventors: Yuxin Feng, Shenzhen (CN); Yan Chen, Shenzhen (CN); Yunfeng Gao, Shenzhen (CN)

(73) Assignees: HAN'S LASER TECHNOLOGY INDUSTRY GROUP CO., LTD., Guangdong (CN); SHENZHEN HAN'S SMART CONTROLTECHNOLOGY CO., LTD., Guangdong (CN)

( * ) Notice: Subject to any disclaimer, the term of this patent is extended or adjusted under 35 U.S.C. 154(b) by 190 days.

(21) Appl. No.: 17/260,688

(22) PCT Filed: Jul. 17, 2018

(86) PCT No.: PCT/CN2018/095905
§ 371 (c)(1),
(2) Date: Jan. 15, 2021

(87) PCT Pub. No.: WO2020/014854
PCT Pub. Date: Jan. 23, 2020

(65) Prior Publication Data
US 2021/0326293 A1  Oct. 21, 2021

(51) Int. Cl.
*G06F 13/40* (2006.01)
*G05B 19/414* (2006.01)

(52) U.S. Cl.
CPC ....... *G06F 13/4068* (2013.01); *G05B 19/414* (2013.01); *G05B 2219/31136* (2013.01)

(58) Field of Classification Search
None
See application file for complete search history.

(56) References Cited

U.S. PATENT DOCUMENTS

2014/0244869 A1\* 8/2014 Adrian ............... G06F 13/4022
710/106

FOREIGN PATENT DOCUMENTS

| CN | 1964363 A | 5/2007 |
|---|---|---|
| CN | 101789557 A | 7/2010 |

(Continued)

OTHER PUBLICATIONS

International Search Report dated Apr. 10, 2019 issued in PCT/CN2018/095905 (4 pages).

(Continued)

*Primary Examiner* — Idriss N Alrobaye
*Assistant Examiner* — Dayton Lewis-Taylor
(74) *Attorney, Agent, or Firm* — Polsinelli PC

(57) ABSTRACT

The present application relates to a bus communication signal conversion method and device, a medium, and a numerical control machine tool control equipment. The bus communication signal conversion method comprises: acquiring an interface type of a bus interface of a first equipment end; receiving an output signal sent by a communication interface of a second equipment end; extracting a working parameter value of the second equipment end from the output signal; and sending the working parameter value of the second equipment end to the bus interface of the first equipment end according to a communication protocol corresponding to the interface type. The use of the present method can achieve signal conversion between different (Continued)

types of interfaces, thereby ensuring effectiveness of communication.

18 Claims, 7 Drawing Sheets

(56) References Cited

FOREIGN PATENT DOCUMENTS

| | | | |
|---|---|---|---|
| CN | 102170430 | A | 6/2013 |
| CN | 203084509 | U | 7/2013 |
| CN | 103558780 | A | 2/2014 |
| CN | 103744355 | A | 4/2014 |
| CN | 205003532 | U | 1/2016 |
| CN | 106407145 | A | 2/2017 |
| CN | 106557447 | A | 4/2017 |
| CN | 108111382 | A | 6/2018 |
| CN | 207457812 | U | 6/2018 |

OTHER PUBLICATIONS

Chinese Office Action dated Feb. 7, 2022 issued in corresponding Patent Application No. 201880094776.0 w/English Translation (16 pages).
Chinese Office Action issued in corresponding CN Application No. 201880094776.0, dated Oct. 24, 2022.

\* cited by examiner

BUS COMMUNICATION SIGNAL CONVERSION METHOD AND DEVICE, MEDIUM, AND NUMERICAL CONTROL MACHINE TOOL CONTROL EQUIPMENT

CROSS REFERENCE TO RELATED APPLICATION

This application is a national stage of International Application No. PCT/CN2018/095905 filed on Jul. 17, 2018, entitled "BUS COMMUNICATION SIGNAL CONVERSION METHOD AND APPARATUS, MEDIUM, AND NUMERICAL CONTROL MACHINE TOOL CONTROL DEVICE", the entire content of which is incorporated herein by reference.

TECHNICAL FIELD

The present disclosure relates to the field of communication technology, in particular to a bus communication signal conversion method and device, a medium, and a numerical control machine tool control equipment.

BACKGROUND

Bus communication is a communication manner that transmits signals through a bus, and a communication interface used in bus communication is a bus interface. The bus communication has advantages of fast speed, strong anti-interference ability, large amount of transmission information, and convenient wiring, and the bus communication is increasingly used to transmit signals between control equipment and controlled equipment. For example, in a numerical control machine tool, a numerical control device and a servo driver gradually change from communicating through an analog quantity interface to communicating through a bus interface.

However, the types of buses are diverse, and the types of bus interfaces are diverse. The use of bus communication between devices is prone to incompatibility due to different types of bus interfaces, and the effectiveness of communication is low. For example, when the servo driver selected by the machine tool manufacturer is inconsistent with the bus type supported by the numerical control device, effective communication cannot be achieved. The supplier of the servo driver or numerical control device needs to re-develop a new bus interface, which is inefficient.

SUMMARY

According to various embodiments of the present disclosure, a bus communication signal conversion method and device, a medium, and a numerical control machine tool control equipment capable of communicating effectively are provided.

A bus communication signal conversion method includes:
acquiring an interface type of a bus interface of a first equipment end;
receiving an output signal sent by a communication interface of a second equipment end;
extracting a working parameter value of the second equipment end from the output signal; and
sending the working parameter value of the second equipment end to the bus interface of the first equipment end according to a communication protocol corresponding to the interface type.

A bus communication signal conversion device includes a memory and a processor, the memory stores a computer program, and when the processor executes the computer program, the following steps are implemented:
acquiring an interface type of a bus interface of a first equipment end;
receiving an output signal sent by a communication interface of a second equipment end;
extracting a working parameter value of the second equipment end from the output signal; and
sending the working parameter value of the second equipment end to the bus interface of the first equipment end according to a communication protocol corresponding to the interface type.

A computer readable storage medium, on which a computer program is stored, wherein, when the computer program is executed by the processor, the following steps will be implemented:
acquiring an interface type of a bus interface of a first equipment end;
receiving an output signal sent by a communication interface of a second equipment end;
extracting a working parameter value of the second equipment end from the output signal; and
sending the working parameter value of the second equipment end to the bus interface of the first equipment end according to a communication protocol corresponding to the interface type.

A bus communication signal conversion device includes a signal converter and a bus controller, the signal converter is connected to the bus controller;
the signal converter receiving an output signal sent by a communication interface of a second equipment end, extracting a working parameter value of the second equipment end from the output signal, and sending the working parameter value of the second equipment end to the bus controller; and
the bus controller acquiring an interface type of a bus interface of a first equipment end, and after receiving the working parameter value of the second equipment end, sending the working parameter value of the second equipment end to the bus interface of the first equipment end according to a communication protocol corresponding to the interface type.

A numerical control machine tool control equipment includes a bus communication signal conversion device, a numerical control device and a servo driver, the numerical control device is provided with a communication interface, the servo driver is provided with a bus interface, the bus communication signal conversion device is connected to the communication interface and the bus interface;
the bus communication signal conversion device acquiring an interface type of the bus interface of the servo driver, receiving an output signal sent by the communication interface of the numerical control device, and extracting a working parameter value of the numerical control device from the output signal; and
the bus communication signal conversion device sending the working parameter value of the numerical control device to the bus interface of the servo driver according to a communication protocol corresponding to the interface type. The details of one or more embodiments of the disclosure are set forth in the accompanying drawings and description below. Other features, purposes and advantages of the present disclosure will become apparent from the description, the accompanying drawings, and the claims.

BRIEF DESCRIPTION OF THE DRAWINGS

In order to illustrate the technical solutions in the embodiments of the present disclosure or the prior art more clearly, the accompanying drawings used in the embodiments or the prior art description will be briefly described below. Obviously, the drawings in the following description are only some embodiments of the present disclosure, for those of ordinary skill in the art, other drawings can be obtained according to these drawings without any creative efforts.

DETAILED DESCRIPTION

To make the purposes, technical solutions and advantages of the present disclosure to be more apparent and understandable, reference will be made to the accompanying drawings and embodiments to describe the present disclosure in detail below. It should be understood that the specific embodiments described herein are only used to explain the present disclosure and not intended to limit the present disclosure.

Figure 1:
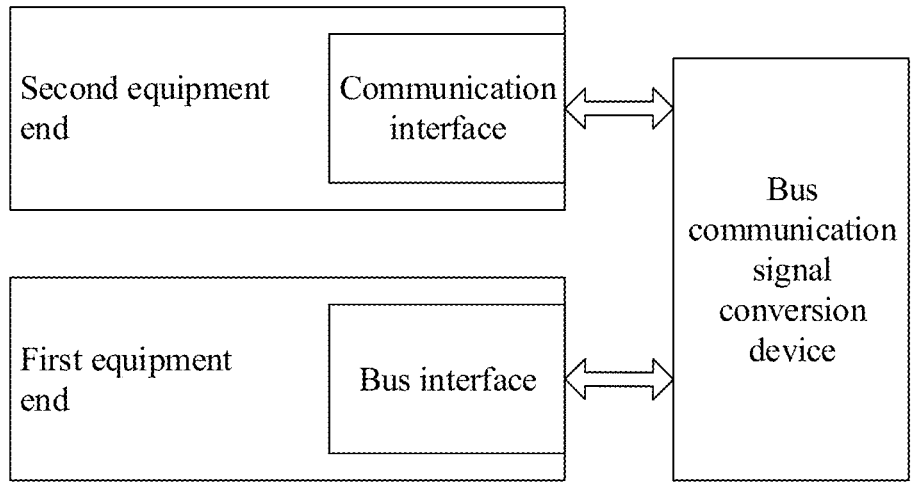
FIG. 1 is an application environment diagram of a bus communication signal conversion method in an embodiment.

The bus communication signal conversion method provided by the present disclosure may be applied to the application environment as shown in FIG. 1. A bus communication signal conversion device communicates with a first equipment end and a second equipment end. The bus communication signal conversion device acquires an interface type of a bus interface of the first equipment end; the bus communication signal conversion device receives an output signal sent by a communication interface of the second equipment end, extracts a working parameter value of the second equipment end from the output signal, and sends the working parameter value of the second equipment end to the bus interface of the first equipment end according to a communication protocol corresponding to the interface type. The first equipment end and the second equipment end are an end that receives signals and an end that sends signals, respectively, and the first equipment end adopts a bus interface.

Figure 2:
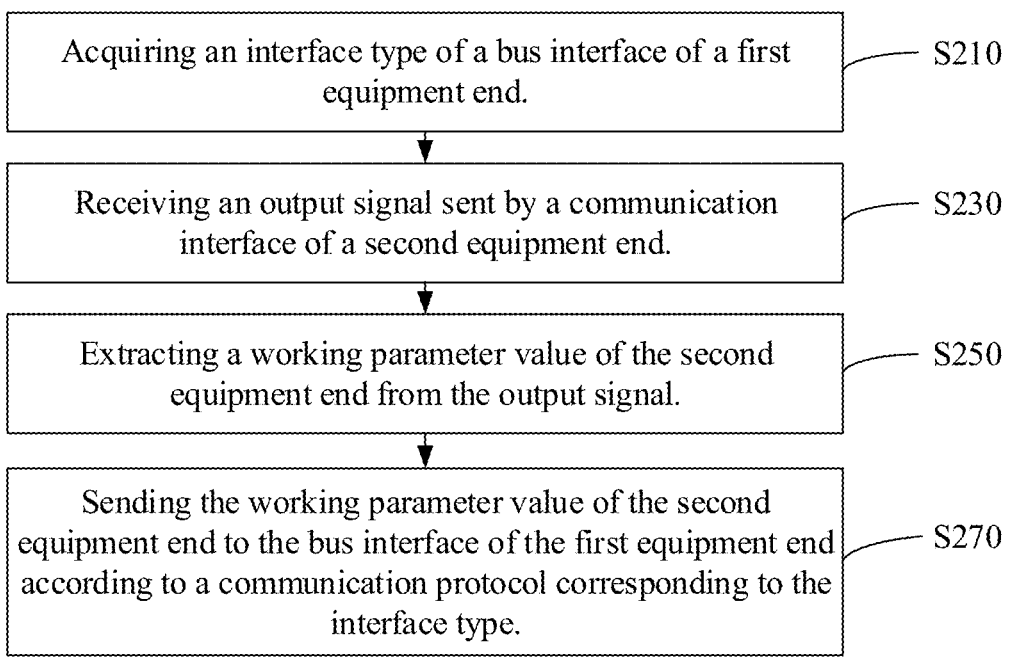
FIG. 2 is a schematic flow chart of a bus communication signal conversion method in an embodiment.

In an embodiment, as shown in FIG. 2, a bus communication signal conversion method is provided. Taking the method applied to the bus communication signal conversion device in FIG. 1 as an example for description, the method includes the following steps:

Step S210: Acquiring an interface type of a bus interface of a first equipment end.

The first equipment end adopts a bus interface. The interface type of the bus interface is determined by the type of the bus, that is, one type of bus corresponds to one type of bus interface. Specifically, the bus communication signal conversion device may receive a type of the bus interface of the first equipment end input by a user through an input device. The bus communication signal conversion device may also send requests to the first equipment end sequentially according to communication protocols corresponding to set multiple interface types, and acquires the interface type of the bus interface of the first equipment end being: an interface type corresponding to the communication protocol used for which an information returned from the first equipment end in response to the request is received.

Step S230: Receiving an output signal sent by a communication interface of a second equipment end.

The output signal is a signal sent by the communication interface of the second equipment end. The type of the communication interface of the second equipment end is different from the type of the bus interface of the first equipment end. For example, the communication interface of the second equipment end may be an analog quantity interface, a switch quantity interface, a bus interface having a type different from the type of the bus interface of the first equipment end, and the like. Specifically, the bus communication signal conversion device may receive the output signal according to a communication protocol corresponding to the communication interface of the second equipment end.

Step S250: Extracting a working parameter value of the second equipment end from the output signal.

Communication between devices is usually to transmit data. For example, a control device sends data to a controlled device, and the controlled device performs work according to the received data. If the second equipment end is a control device, then the working parameter value of the second equipment end is a parameter value for the second equipment end controlling the first equipment end to perform work. If the second equipment end is a controlled device, then the working parameter value of the second equipment end is a parameter value for feeding back a working condition of the second equipment end.

Step S270: Sending the working parameter value of the second equipment end to the bus interface of the first equipment end according to a communication protocol corresponding to the interface type.

The communication protocol corresponding to the interface type is the communication protocol supported by the bus interface of the first equipment end. The bus communication signal conversion device sends the working parameter value of the second equipment end according to the communication protocol corresponding to the interface type, and the bus interface of the first equipment end can receive correctly, that is, the output signal of the second equipment end is converted into a signal supported by the bus interface of the first equipment end.

Specifically, the bus communication signal conversion device may call a protocol conversion program. The protocol conversion program converts the working parameter value of the second equipment end into a signal supported by the bus interface of the first equipment end according to the communication protocol corresponding to the interface type, and sends the converted signal to the bus interface of the first equipment end. Different interface types of bus interface can correspond to different protocol conversion programs. For example, the bus communication signal conversion device can pre-store protocol conversion programs of multiple interface types; of course, it can also be that the user burns the corresponding protocol conversion program to the bus communication signal conversion device after that the bus communication signal conversion device acquires the interface type of the bus interface.

In the above bus communication signal conversion method, the working parameter value of the second equipment end is obtained according to the output signal sent by the communication interface of the second equipment end, and the working parameter value of the second equipment end is sent to the first equipment end changed according to the communication protocol corresponding to the interface type of the bus interface of the first equipment end, such that the bus interface of the first equipment end can receive the working parameter value of the second equipment end correctly. In this way, the signal conversion is performed between the communication interface of the second equipment end and the bus interface of the first equipment end without changing the designs for the interfaces inside the first equipment end and the second equipment end themselves, and the first equipment end and the second equipment end can be compatible with each other, thereby ensuring the effectiveness of communication.

Specifically, step S210 is executed before step S230 in FIG. 2, it can be understood that in other embodiments, step S210 may also be executed after step S230, as long as it is executed before step S270.

Figure 3:
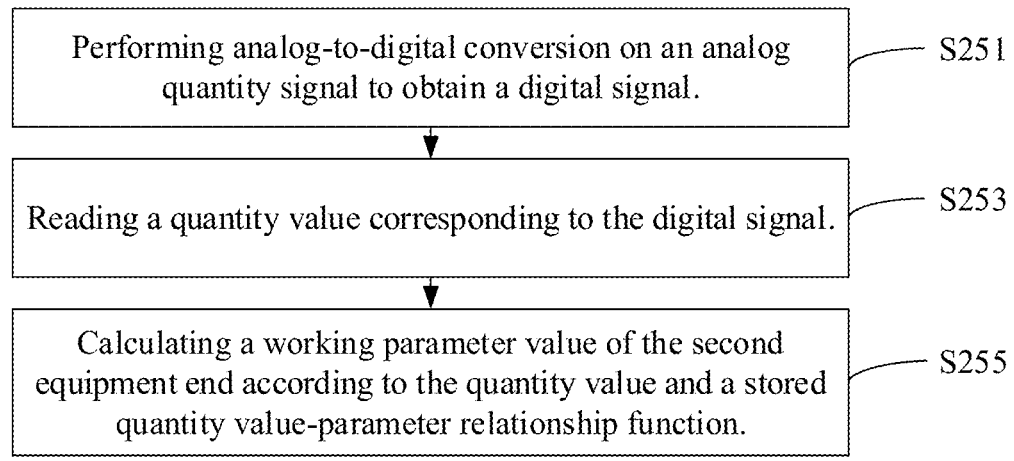
FIG. 3 is a schematic flow chart of steps of extracting a working parameter value of the second equipment end from the output signal in an embodiment.

In an embodiment, the communication interface of the second equipment end includes an analog quantity interface, and the output signal includes an analog quantity signal. Referring to FIG. 3, step S250 includes step S251 to step S255.

S251: Performing analog-to-digital conversion on an analog quantity signal to obtain a digital signal.

Specifically, the bus communication signal conversion device may adopt an analog-to-digital converter to perform analog-to-digital conversion on the analog quantity signal, or use a program with an analog-to-digital conversion function to perform analog-to-digital conversion on the analog quantity signal.

S253: Reading a quantity value corresponding to the digital signal.

The digital signal uses two physical states to represent 0 and 1. The bus communication signal conversion device reads the magnitude value corresponding to the digital signal, specifically, the bus communication signal conversion device performs parsing according to a coding rule of the digital signal to obtain the quantity value. For example, the digital signal represented in binary is 0011. According to the binary coding rule, read a decimal represented by 0011 to obtain the quantity value.

S255: Calculating a working parameter value of the second equipment end according to the quantity value and a stored quantity value-parameter relationship function.

The quantity value-parameter relationship function is a function representing the corresponding relationship between the quantity values and the working parameter values of the second equipment end. Based on the quantity value-parameter relationship function, if a quantity value is known, then a parameter value can be calculated; if a parameter value is known, then a quantity value can be calculated. Specifically, the bus communication signal conversion device substitutes the quantity value read in step S253 into the quantity value-parameter relationship function to calculate the working parameter value of the second equipment end.

In this embodiment, the analog quantity signal sent by the analog quantity port can be parsed to obtain the working parameter value of the second equipment end, and the working parameter value of the second equipment end can be sent to the bus interface of the first equipment end according to the communication protocol corresponding to the interface type, thus the signal conversion between the analog quantity interface and the bus interface can be realized, making the communication effective.

In an embodiment, before step S255, the method further includes a model building step: acquiring a minimum quantity value and a corresponding minimum parameter value, and a maximum quantity value and a corresponding maximum parameter value stored in the second equipment end; and generating a quantity value-parameter relationship function according to the minimum quantity value, the maximum quantity value, the minimum parameter value, the maximum parameter value, and a preset function model, and storing the quantity value-parameter relationship function.

The preset function model is a pre-stored function expression, which reflects a corresponding relationship between the quantity values and the parameter values of the second equipment end. Specifically, the minimum quantity value and the corresponding minimum parameter value are substituted into the preset function model to obtain an equation set, and the maximum quantity value and the corresponding maximum parameter value are substituted into the preset function model to obtain another equation set. The two equation sets are simultaneous and solved to obtain a quantity value-parameter relationship function, and the value-parameter relationship function is stored to obtain a stored value-parameter relationship function.

If the minimum parameter values corresponding to a minimum quantity value are different, and the maximum parameter value corresponding to a maximum quantity value is different, then the corresponding relationships between the quantity values and the parameter values are different. By generating the quantity value-parameter relationship function according to the minimum quantity value and the corresponding minimum parameter value, and the maximum quantity value and the corresponding maximum parameter value, the quantity value-parameter relationship function can accurately reflect the corresponding relationship between the quantity values and the parameter values of the second equipment end, thereby the working parameter value of the second equipment end extracted according to the output signal has high accuracy.

Specifically, the precedence relationship between the execution sequences of the model building step, step S251, and step S253 is not unique, as long as that the model building step is executed before step S255. It can be understood that, in other embodiments, different second equipment ends may use a same quantity value-parameter relationship function, and the quantity value-parameter relationship function may be stored in advance and does not need to be generated in real time.

In an embodiment, the first equipment end is a servo driver, the second equipment end is a numerical control device, and the minimum parameter value, the maximum parameter value and the working parameter value of the second equipment end are each a speed value. That is, in this embodiment, the servo driver adopts a bus interface, and the numerical control device adopts an analog quantity interface.

Figure 4:
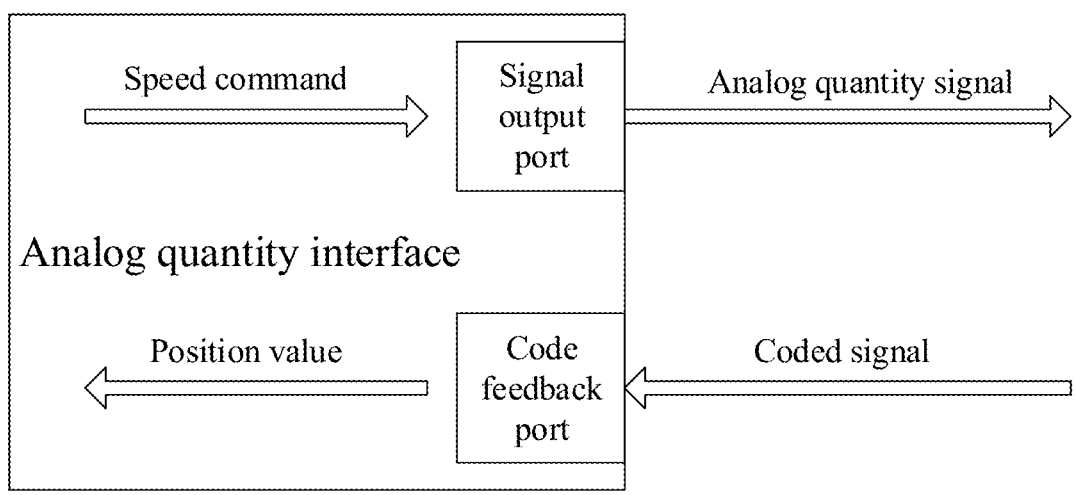
FIG. 4 is a schematic structure diagram of an analog quantity interface of a numerical control device in an embodiment.

The numerical control device is a control device, and the servo driver is a controlled device. The working modes of the numerical control device and the servo driver usually includes a data issuing stage and an uploading feedback stage; the data issuing stage is performed first: the numerical control device sends a speed command to the servo driver, the speed command carries a speed value, and the servo driver outputs a speed control command according to the speed value to control the work of a servo motor; then, the upload feedback phase is started: the servo driver feeds back an displacement in the actual work of the servo motor to the numerical control device. Generally speaking, the analog quantity interface of the numerical control device includes a signal output port and a code feedback port, as shown in FIG. 4. The signal output port is mainly configured to transmit the speed command of the numerical control device in the form of analog quantity, that is, to output an analog quantity signal. The greater the speed value, the greater the value corresponding to the analog quantity signal. For example, a voltage value of 0V-10V can be used to represent the minimum to maximum speed value. The function of the code feedback port is to receive the displacement feedback in the form of a coded signal. The numerical control device obtains the displacement by extracting and parsing the signal, and can calculate the current position value and speed of the servo motor according to the displacement.

In this embodiment, step S210 to step S270 are the process of converting the analog quantity signal sent by the numerical control device into a signal that can be supported by the bus interface of the servo driver during the data issuing stage. In this way, the servo driver and the numerical control device can be compatible with each other, without changing the design for the interfaces inside the servo driver and the numerical control device themselves, thus the communication is effective. Moreover, suppliers of the servo drive or the numerical control device do not need to re-develop new interfaces, which can reduce costs.

It can be understood that, in other embodiments, the first equipment end may also be a numerical control device, and the second equipment end may be a servo driver. That is, the servo driver may adopt an analog quantity interface, and the numerical control device may adopt a bus interface. Correspondingly, step S210 to step S270 are a process of converting the analog quantity signal sent by the servo driver into a signal that can be supported by the bus interface of the numerical control device during the uploading feedback stage.

Figure 5:
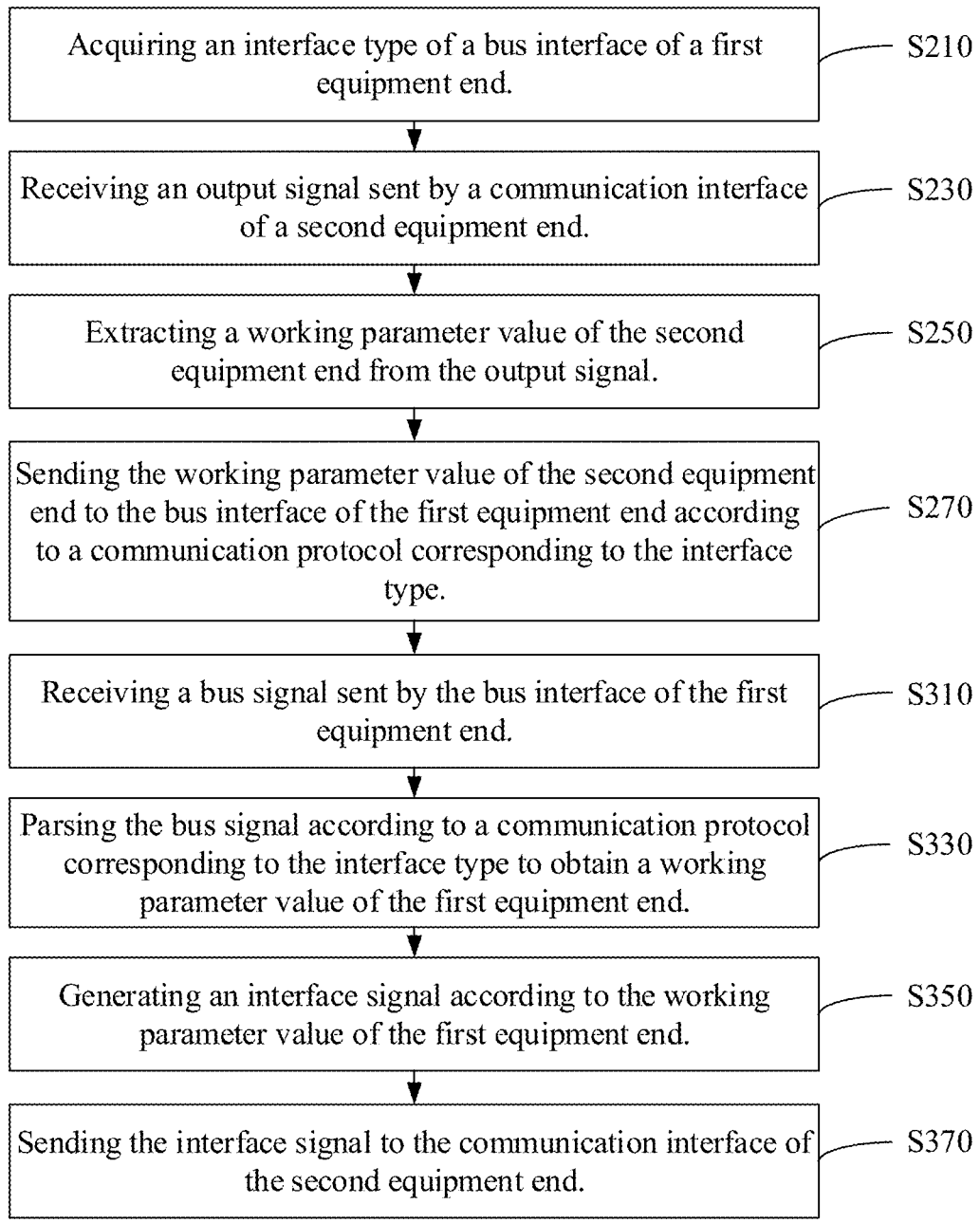
FIG. 5 is a schematic flow chart of a bus communication signal conversion method in another embodiment.

In an embodiment, referring to FIG. 5, after step S210, the method further includes step S310 to step S370.

S310: Receiving a bus signal sent by the bus interface of the first equipment end.

The bus signal is a signal output by the bus interface of the first equipment end. Specifically, the bus communication signal conversion device may receive the bus signal according to the communication protocol corresponding to the interface type of the bus interface.

S330: Parsing the bus signal according to a communication protocol corresponding to the interface type to obtain a working parameter value of the first equipment end.

If the first equipment end is a controlled device, then the working parameter value of the first equipment end is a parameter value for feeding back a working condition of the first equipment end; if the first equipment end is a control device, then the working parameter value of the first equipment end is a parameter value for the first equipment end controlling the second equipment end to perform work.

S350: Generating an interface signal according to the working parameter value of the first equipment end.

The signal type of the interface signal is a signal type supported by the communication interface of the second equipment end. The signal type supported by the communication interface of the second equipment end is a signal type that can by correctly received and parsed by the second equipment end, that is, the interface signal can be correctly received and parsed by the second equipment end. Specifically, if the communication interface of the second equipment end is an analog quantity interface, then the interface signal can be a coded signal.

S370: Sending the interface signal to the communication interface of the second equipment end.

Specifically, the bus communication signal conversion device may send the interface signal according to a communication protocol corresponding to the communication interface of the second equipment end.

In this embodiment, the bus signal is parsed to obtain the working parameter value of the first equipment end, the interface signal is generated according to the working parameter value of the first equipment end, and the interface signal is sent to the second equipment end, so that the communication interface of the second equipment end can receive it correctly. In this way, through signal conversion, the bus signal sent by the bus interface of the first equipment end can be converted into the signal supported by the communication interface of the second equipment end. There is also no need to change the designs for the interfaces inside the first equipment end and the second equipment end themselves, thereby possess high compatibility and high communication effectiveness.

Figure 6:
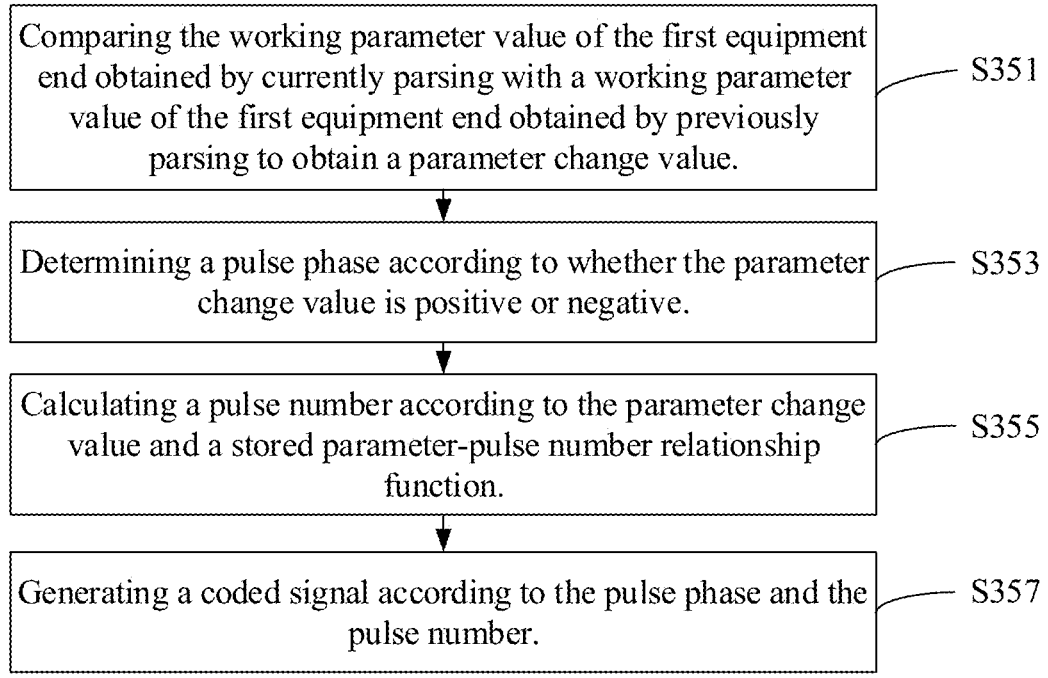
FIG. 6 is a schematic flow chart of generating an interface signal according to the working parameter value of the first equipment end in an embodiment.

In an embodiment, the communication interface of the second equipment end includes an analog quantity interface, and the interface signal is a coded signal. Referring to FIG. 6, step S350 includes step S351 to step S357.

S351: Comparing the working parameter value of the first equipment end obtained by currently parsing with a working parameter value of the first equipment end obtained by previously parsing to obtain a parameter change value.

The first equipment end and the second equipment end generally communicate periodically at intervals with each other. Correspondingly, the bus communication signal conversion device periodically receives the bus signal sent by the first equipment end, so as to periodically parse the bus signal to obtain the working parameter value of the first equipment end. The working parameter value of the first equipment end obtained by previously parsing refers to the working parameter value of the first equipment end obtained through last parsing before. Specifically, the bus communication signal conversion device subtracts the working parameter value of the first equipment end obtained by previously parsing from the working parameter value of the first equipment end obtained by currently parsing to obtain a parameter change value.

S353: Determining a pulse phase according to whether the parameter change value is positive or negative.

The working parameter value of the first equipment end is a value which can be positive or negative, and the parameter change value is also a value which can be positive or negative, where the positive and the negative represent a positive sign and a negative sign. The positive or negative of the parameter change value is used to indicate the change condition of the parameter value. Taking the working parameter value of the first equipment end obtained by previously parsing is subtracted from the working parameter value of the first equipment end obtained by currently parsing as an example for description. The parameter change value has a positive sign indicates that it is increased relative to that of previously parsing, and the parameter change value has a negative sign indicates that it is decreased relative to that of previously parsing. For example, if the working parameter value of the first equipment end is a displacement, then, if the parameter change value has a positive sign, it means that the displacement is increased relative to that of previously parsing, and if the parameter change value has a negative sign, it means that the displacement is decreased relative to that of previously parsing.

Specifically, the bus communication signal conversion device determines the pulse phase according to whether the parameter change value is positive or negative based on a preset corresponding relationship between the phase, and, the positive and negative. For example, if the parameter change value has a positive sign, the pulse phase is determined to be 90° ahead, and if the parameter change value has a negative sign, the pulse phase is determined to be 90° lag.

S355: Calculating a pulse number according to the parameter change value and a stored parameter-pulse number relationship function.

The parameter-pulse number relationship function is a function representing the corresponding relationship between the parameter change values and the pulse numbers. Specifically, the bus communication signal conversion device substitutes the parameter change value into the parameter-pulse number relationship function to calculate the pulse number.

S357: Generating the coded signal according to the pulse phase and the pulse number.

Figure 7:
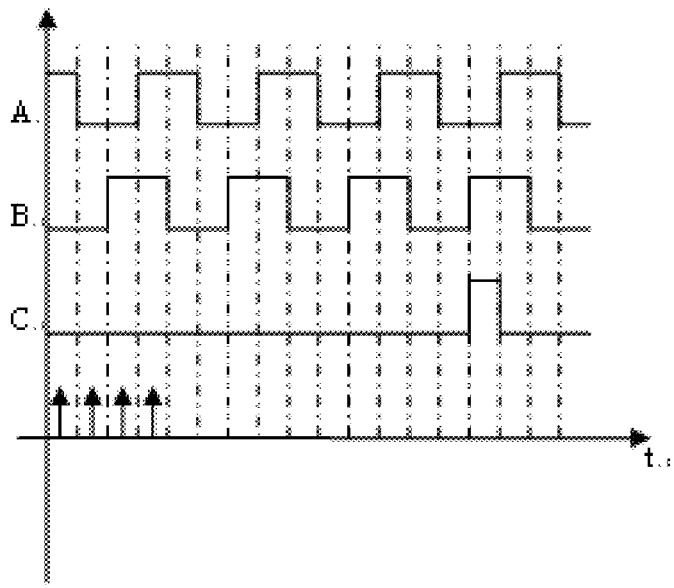
FIG. 7 is a schematic diagram of a coded signal and a reference signal in an embodiment.

In this embodiment, through step S351 to step S357, the coded signal is generated according to the working parameter value of the first equipment end, thus the signal conversion is realized. The coded signal can be received by the analog quantity interface of the second equipment end, thus the communication is effective. For example, as shown in FIG. 7, signal A is a coded signal, and signal B is a reference signal. If the phase of the coded signal is 90° ahead, then signal A with a phase ahead for 90° is generated from signal B. If the phase of the coded signal is 90° lag, then signal A with a phase lag for 90° is generated from signal B.

In an embodiment, before step S355, the method further includes a relationship function generating step: acquiring a preset parameter change value and a corresponding pulse number stored in the second equipment end; substituting the preset parameter change value and the corresponding pulse number into a preset relationship expression to generate a parameter-pulse number relationship function, and storing the parameter-pulse number relationship function.

Specifically, the bus communication signal conversion device generates and then stores the parameter-pulse number relationship function, thus obtains the stored parameter-pulse number relationship function. By generating the parameter-pulse number relationship function according to the preset parameter change value and the corresponding pulse number, the relationship between the parameter change values and the pulse numbers can be accurately reflected, thus the accuracy of the pulse number calculated according to the parameter-pulse number relationship function and the parameter change value is high, and the generated coded signal has high accuracy.

Specifically, the precedence relationship between the execution sequences of the relationship function generating step, step S351, and step S353 is not unique, as long as that the relationship function generating step is executed before step S355. It can be understood that, in other embodiments, for different second equipment ends, the pulse numbers corresponding to the preset parameter values are the same, that is, the parameter-pulse number relationship function can be fixed, and the parameter-pulse number relationship is stored in advance and does not need to be generated in real-time.

In an embodiment, the first equipment end is a servo driver, and the second equipment end is a numerical control device. The bus signal is a signal fed back by the servo driver through the bus interface after the servo driver receives the working parameter value of the second equipment end, and the working parameter value of the first equipment end includes a displacement.

In this embodiment, the servo driver adopts a bus interface, and the numerical control device adopts a communication interface, which may specifically be an analog quantity interface. Steps S310 to S370 are used to a process of converting the bus signal sent by the servo driver into a signal supported by the communication interface of the numerical control device during the process of uploading a feedback signal between the numerical control device and the servo driver. The numerical control device performs a closed-loop control through the feedback signal. In this way, the servo driver and the numerical control device can be compatible with each other, without changing the design for the interfaces inside the servo driver and the numerical control device themselves, thus the communication is effective. Moreover, suppliers of the servo drive or the numerical control device do not need to re-develop new interfaces, which can reduce costs.

It can be understood that, in other embodiments, the first equipment end may be a numerical control device, and the second equipment end is a servo driver. Correspondingly, steps S310 to S370 are the process of converting the bus signal sent by the numerical control device into a signal that can be supported by the communication interface of the servo driver during the data issuing stage.

It should be understood that although the various steps in the flowchart of FIGS. 2 to 3 and FIGS. 5 to 6 are sequentially displayed as indicated by the arrows, these steps are not necessarily performed in the order indicated by the arrows. Unless explicitly stated herein, the performing order of the steps is not be limited strictly, and the steps may be performed in other orders. Moreover, at least part of the steps in FIGS. 2 to 3 and FIGS. 5 to 6 may comprise a plurality of sub-steps or phases, which are not necessary to be performed simultaneously, but may be performed at different times, and for the performing order thereof, it is not necessary to be performed sequentially, but may be performed by turns or alternately with other steps or sub-steps of other steps or at least part of the phases.

Figure 8:
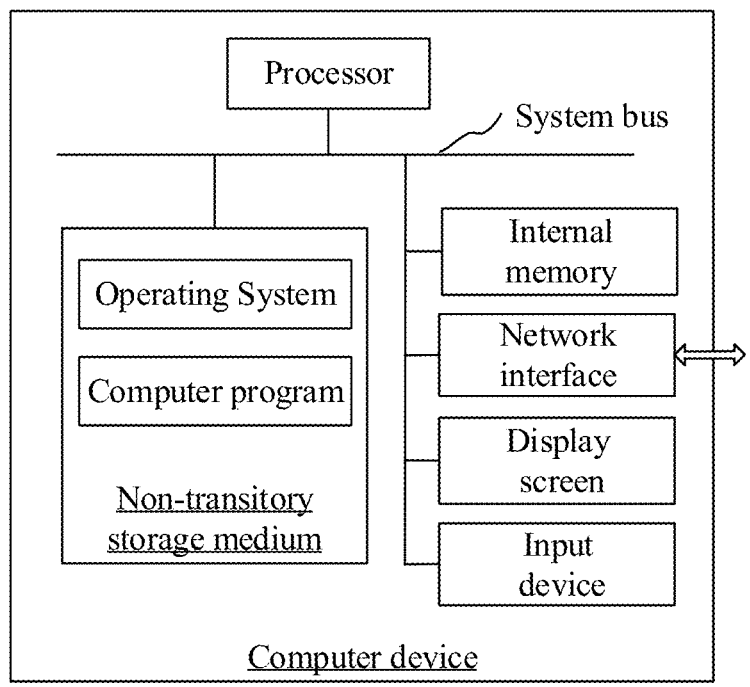
FIG. 8 is an internal structure diagram of a bus communication signal conversion device in an embodiment.

In an embodiment, a bus communication signal conversion device is provided, and an internal structure diagram thereof may be as shown in FIG. 8. The bus communication signal conversion device includes a processor, a memory, a network interface, a display screen, and an input device connected by a system bus. The processor of the bus communication signal conversion device is configured to provide computing and control capabilities. The memory of the bus communication signal conversion device includes a non-volatile storage medium and an internal memory. The non-transitory storage medium stores an operating system and a computer program. The internal memory provides an environment for the operations of the operating system and the computer program in the non-transitory storage medium. The network interface of the bus communication signal conversion device is configured to communicate with external ends via network connections. When the computer program is executed by the processor, the bus communication signal conversion method is implemented. The display screen of the bus communication signal conversion device may be a liquid crystal display or an electronic ink display, and the input device of the bus communication signal conversion device may be a touch layer covered on the display screen, or may be a button, a trackball or a touchpad provided on the bus communication signal conversion device casing, and may also be an external keyboard, a touchpad or a mouse.

It will be understood by those skilled in the art that the structure shown in FIG. 8 is only a block diagram of a part of the structure related to the solution of the present disclosure, and does not constitute a limitation of the bus communication signal conversion device to which the solution of the present disclosure is applied. The specific bus communication signal conversion device may include more or fewer components than those shown in the figure, or combine some components, or have different component arrangements.

In an embodiment, a bus communication signal conversion device including a memory and a processor is provided. The memory stores a computer program, and when the processor executes the computer program, the steps below will be implemented: acquiring an interface type of a bus interface of a first equipment end; receiving an output signal sent by a communication interface of a second equipment end; extracting a working parameter value of the second equipment end from the output signal; and sending the working parameter value of the second equipment end to the bus interface of the first equipment end according to a communication protocol corresponding to the interface type.

In the above bus communication signal conversion device, the working parameter value of the second equipment end is obtained according to the output signal sent by the communication interface of the second equipment end, and the working parameter value of the second equipment end is sent to the first equipment end changed according to the communication protocol corresponding to the interface type of the bus interface of the first equipment end, such that the bus interface of the first equipment end can receive the working parameter value of the second equipment end correctly. In this way, the signal conversion is performed between the communication interface of the second equipment end and the bus interface of the first equipment end without changing the designs for the interfaces inside the first equipment end and the second equipment end themselves, and the first equipment end and the second equipment end can be compatible with each other, thereby ensuring the effectiveness of communication.

In an embodiment, the communication interface of the second equipment end includes an analog quantity interface, and the output signal includes an analog quantity signal. When the processor executes the computer program, the implemented step of extracting a working parameter value of the second equipment end from the output signal includes: performing analog-to-digital conversion on an analog quantity signal to obtain a digital signal; reading a quantity value corresponding to the digital signal; and calculating a working parameter value of the second equipment end according to the quantity value and a stored quantity value-parameter relationship function.

In this embodiment, the bus communication signal conversion device can parse the analog quantity signal sent by the analog quantity port to obtain the working parameter value of the second equipment end, and send the working parameter value of the second equipment end to the bus interface of the first equipment end according to the communication protocol corresponding to the interface type, thus the signal conversion between the analog quantity interface and the bus interface can be realized, making the communication effective.

In an embodiment, when the processor executes the computer program, before the step of calculating a working parameter value of the second equipment end according to the quantity value and a stored quantity value-parameter relationship function is implemented, the following steps are further implemented: acquiring a minimum quantity value and a corresponding minimum parameter value, and a maximum quantity value and a corresponding maximum parameter value stored in the second equipment end; and generating a quantity value-parameter relationship function according to the minimum quantity value, the maximum quantity value, the minimum parameter value, the maximum parameter value, and a preset function model, and storing the quantity value-parameter relationship function.

By generating the quantity value-parameter relationship function according to the minimum quantity value and the corresponding minimum parameter value, and the maximum quantity value and the corresponding maximum parameter value, the quantity value-parameter relationship function can accurately reflect the corresponding relationship between the quantity values and the parameter values of the second equipment end, thereby the working parameter value of the second equipment end extracted according to the output signal has high accuracy.

In an embodiment, the first equipment end is a servo driver, the second equipment end is a numerical control device, and the minimum parameter value, the maximum parameter value and the working parameter value of the second equipment end are each a speed value.

In an embodiment, when the processor executes the computer program, after the step of acquiring an interface type of a bus interface of a first equipment end is implemented, the following steps are further implemented: receiving a bus signal sent by the bus interface of the first equipment end; parsing the bus signal according to a communication protocol corresponding to the interface type to obtain a working parameter value of the first equipment end; generating an interface signal according to the working parameter value of the first equipment end; and sending the interface signal to the communication interface of the second equipment end.

In this embodiment, the bus signal is parsed to obtain the working parameter value of the first equipment end, the interface signal is generated according to the working parameter value of the first equipment end, and the interface signal is sent to the second equipment end, so that the communication interface of the second equipment end can receive it correctly. In this way, through signal conversion, the bus signal sent by the bus interface of the first equipment end can be converted into the signal supported by the communication interface of the second equipment end. There is also no need to change the designs for the interfaces inside the first equipment end and the second equipment end themselves, thereby possess high compatibility and high communication effectiveness.

In an embodiment, the communication interface of the second equipment end includes an analog quantity interface, and the interface signal is a coded signal. When the processor executes the computer program, the implemented step of generating an interface signal according to the working parameter value of the first equipment end includes: comparing the working parameter value of the first equipment end obtained by currently parsing with a working parameter value of the first equipment end obtained by previously parsing to obtain a parameter change value; determining a pulse phase according to whether the parameter change value is positive or negative; calculating a pulse number according to the parameter change value and a stored parameter-pulse number relationship function; and generating a coded signal according to the pulse phase and the pulse number.

By generating the coded signal according to the working parameter value of the first equipment end, the signal conversion is realized. The coded signal can be received by the analog quantity interface of the second equipment end, thus the communication is effective.

In an embodiment, when the processor executes the computer program, before the step of calculating a pulse number according to the parameter change value and a stored parameter-pulse number relationship function is implemented, the following steps are further implemented: acquiring a preset parameter change value and a corresponding pulse number stored in the second equipment end; substituting the preset parameter change value and the corresponding pulse number into a preset relationship expression to generate a parameter-pulse number relationship function, and storing the parameter-pulse number relationship function.

By generating the parameter-pulse number relationship function according to the preset parameter change value and the corresponding pulse number, the relationship between the parameter change values and the pulse numbers can be accurately reflected, thus the accuracy of the pulse number calculated according to the parameter-pulse number relationship function and the parameter change value is high, and the generated coded signal has high accuracy.

In an embodiment, the first equipment end is a servo driver, and the second equipment end is a numerical control device. The bus signal is a signal fed back by the servo driver through the bus interface after the servo driver receives the working parameter value of the second equipment end, and the working parameter value of the first equipment end includes a displacement.

In an embodiment, a computer readable storage medium on which a computer program is stored is provided, and when the computer program is executed by a processor, the following steps are implemented: acquiring an interface type of a bus interface of a first equipment end; receiving an output signal sent by a communication interface of a second equipment end; extracting a working parameter value of the second equipment end from the output signal; and sending the working parameter value of the second equipment end to the bus interface of the first equipment end according to a communication protocol corresponding to the interface type.

In the above computer readable storage medium, when the computer program stored thereon is executed, the working parameter value of the second equipment end is obtained according to the output signal sent by the communication interface of the second equipment end, and the working parameter value of the second equipment end is sent to the first equipment end changed according to the communication protocol corresponding to the interface type of the bus interface of the first equipment end, such that the bus interface of the first equipment end can receive the working parameter value of the second equipment end correctly. In this way, the signal conversion is performed between the communication interface of the second equipment end and the bus interface of the first equipment end without changing the designs for the interfaces inside the first equipment end and the second equipment end themselves, and the first equipment end and the second equipment end can be compatible with each other, thereby ensuring the effectiveness of communication.

In an embodiment, the communication interface of the second equipment end includes an analog quantity interface, and the output signal includes an analog quantity signal. When the computer program is executed by the processor, the step of extracting a working parameter value of the second equipment end from the output signal includes: performing analog-to-digital conversion on an analog quantity signal to obtain a digital signal; reading a quantity value corresponding to the digital signal; and calculating a working parameter value of the second equipment end according to the quantity value and a stored quantity value-parameter relationship function.

In this embodiment, the bus communication signal conversion device can parse the analog quantity signal sent by the analog quantity port to obtain the working parameter value of the second equipment end, and send the working parameter value of the second equipment end to the bus interface of the first equipment end according to the communication protocol corresponding to the interface type, thus the signal conversion between the analog quantity interface and the bus interface can be realized, making the communication effective.

In an embodiment, when the computer program is executed by the processor, before the step of calculating a working parameter value of the second equipment end according to the quantity value and a stored quantity value-parameter relationship function is implemented, the following steps are further implemented: acquiring a minimum quantity value and a corresponding minimum parameter value, and a maximum quantity value and a corresponding maximum parameter value stored in the second equipment end; and generating a quantity value-parameter relationship function according to the minimum quantity value, the maximum quantity value, the minimum parameter value, the maximum parameter value, and a preset function model, and storing the quantity value-parameter relationship function.

By generating the quantity value-parameter relationship function according to the minimum quantity value and the corresponding minimum parameter value, and the maximum quantity value and the corresponding maximum parameter value, the quantity value-parameter relationship function can accurately reflect the corresponding relationship between the quantity values and the parameter values of the second equipment end, thereby the working parameter value of the second equipment end extracted according to the output signal has high accuracy.

In an embodiment, the first equipment end is a servo driver, the second equipment end is a numerical control device, and the minimum parameter value, the maximum parameter value and the working parameter value of the second equipment end are all speed values.

In an embodiment, when the computer program is executed by the processor, after the step of acquiring an interface type of a bus interface of a first equipment end is implemented, the following steps are further implemented: receiving a bus signal sent by the bus interface of the first equipment end; parsing the bus signal according to a communication protocol corresponding to the interface type to obtain a working parameter value of the first equipment end; generating an interface signal according to the working parameter value of the first equipment end; and sending the interface signal to the communication interface of the second equipment end.

In this embodiment, the bus signal is parsed to obtain the working parameter value of the first equipment end, the interface signal is generated according to the working parameter value of the first equipment end, and the interface signal is sent to the second equipment end, so that the communication interface of the second equipment end can receive it correctly. In this way, through signal conversion, the bus signal sent by the bus interface of the first equipment end can be converted into the signal supported by the communication interface of the second equipment end. There is also no need to change the designs for the interfaces inside the first equipment end and the second equipment end themselves, thereby possess high compatibility and high communication effectiveness.

In an embodiment, the communication interface of the second equipment end includes an analog quantity interface, and the interface signal is a coded signal. When the computer program is executed by the processor, the implemented step of generating an interface signal according to the working parameter value of the first equipment end includes: comparing the working parameter value of the first equipment end obtained by currently parsing with a working parameter value of the first equipment end obtained by previously parsing to obtain a parameter change value; determining a pulse phase according to whether the parameter change value is positive or negative; calculating a pulse number according to the parameter change value and a stored parameter-pulse number relationship function; and generating the coded signal according to the pulse phase and the pulse number.

By generating the coded signal according to the working parameter value of the first equipment end, the signal conversion is realized. The coded signal can be received by the analog quantity interface of the second equipment end, thus the communication is effective.

In an embodiment, when the computer program is executed by the processor, before the step of calculating a pulse number according to the parameter change value and a stored parameter-pulse number relationship function is implemented, the following steps are further implemented: acquiring a preset parameter change value and a corresponding pulse number stored in the second equipment end; substituting the preset parameter change value and the corresponding pulse number into a preset relationship expression to generate a parameter-pulse number relationship function, and storing the parameter-pulse number relationship function.

By generating the parameter-pulse number relationship function according to the preset parameter change value and the corresponding pulse number, the relationship between the parameter change values and the pulse numbers can be accurately reflected, thus the accuracy of the pulse number calculated according to the parameter-pulse number relationship function and the parameter change value is high, and the generated coded signal has high accuracy.

In an embodiment, the first equipment end is a servo driver, and the second equipment end is a numerical control device. The bus signal is a signal fed back by the servo driver through the bus interface after the servo driver receives the working parameter value of the second equipment end, and the working parameter value of the first equipment end includes a displacement.

Figure 9:
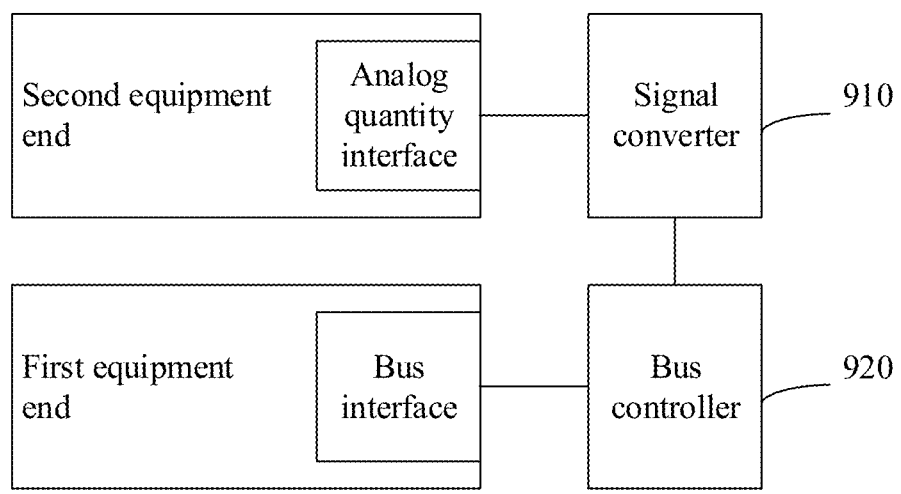
FIG. 9 is a schematic structure diagram of a bus communication signal conversion device in another embodiment.

In another embodiment, a bus communication signal conversion device is provided. Referring to FIG. 9, the bus communication signal conversion device includes a signal converter 910 and a bus controller 920, and the signal converter 910 is connected to the bus controller 920.

The signal converter 910 receives an output signal sent by a communication interface of a second equipment end, extracts a working parameter value of the second equipment end from the output signal, and sends the working parameter value of the second equipment end to the bus controller 920.

The bus controller 920 acquires an interface type of a bus interface of a first equipment end, and after receiving the working parameter value of the second equipment end, sends the working parameter value of the second equipment end to the bus interface of the first equipment end according to a communication protocol corresponding to the interface type.

In the above bus communication signal conversion device, the working parameter value of the second equipment end is obtained according to the output signal sent by the communication interface of the second equipment end, and the working parameter value of the second equipment end is sent to the first equipment end changed according to the communication protocol corresponding to the interface type of the bus interface of the first equipment end, such that the bus interface of the first equipment end can receive the working parameter value of the second equipment end correctly. In this way, the signal conversion is performed between the communication interface of the second equipment end and the bus interface of the first equipment end without changing the designs for the interfaces inside the first equipment end and the second equipment end themselves, and the first equipment end and the second equipment end can be compatible with each other, thereby ensuring the effectiveness of communication.

In an embodiment, the communication interface of the second equipment end includes an analog quantity interface, and the output signal includes an analog quantity signal. The signal converter 910 performs analog-to-digital conversion on an analog quantity signal to obtain a digital signal, reads a quantity value corresponding to the digital signal, calculates a working parameter value of the second equipment end according to the quantity value and a stored quantity value-parameter relationship function, and sends the working parameter value of the second equipment end to the bus controller 920. In this way, the signal conversion between the analog quantity interface and the bus interface can be realized, making the communication effective.

In an embodiment, before the signal converter 910 performs the step of calculating a working parameter value of the second equipment end according to the quantity value and a stored quantity value-parameter relationship function, the signal converter 910 further acquires a minimum quantity value and a corresponding minimum parameter value, and a maximum quantity value and a corresponding maximum parameter value stored in the second equipment end, and generates a quantity value-parameter relationship function according to the minimum quantity value, the maximum quantity value, the minimum parameter value, the maximum parameter value, and a preset function model, and stores the quantity value-parameter relationship function. In this way, the accuracy of the extraction for the working parameter value of the second equipment end is high.

In an embodiment, the first equipment end is a servo driver, the second equipment end is a numerical control device, and the minimum parameter value, the maximum parameter value and the working parameter value of the second equipment end are each a speed value.

In an embodiment, after the bus controller 920 acquires an interface type of a bus interface of the first equipment end, the bus controller 920 receives a bus signal sent by the bus interface of the first equipment end, parses the bus signal according to a communication protocol corresponding to the interface type to obtain a working parameter value of the first equipment end and send the working parameter value of the first equipment end to the signal converter 910. The signal converter 910 generates an interface signal according to the working parameter value of the first equipment end, and sends the interface signal to the communication interface of the second equipment end; the signal type of the interface signal is a signal type supported by the communication interface of the second equipment end. In this way, through signal conversion, the bus signal sent by the bus interface of the first equipment end can be converted into the signal supported by the communication interface of the second equipment end. There is also no need to change the designs for the interfaces inside the first equipment end and the second equipment end themselves, thereby possess high compatibility and high communication effectiveness.

In an embodiment, the communication interface of the second equipment end includes an analog quantity interface, and the interface signal is a coded signal. The signal converter 910 compares the working parameter value of the first equipment end obtained by currently parsing with a working parameter value of the first equipment end obtained by previously parsing to obtain a parameter change value, determines a pulse phase according to whether the parameter change value is positive or negative, calculates a pulse number according to the parameter change value and a stored parameter-pulse number relationship function, and generates the coded signal according to the pulse phase and the pulse number. By generating the coded signal according to the working parameter value of the first equipment end, the signal conversion is realized. The coded signal can be received by the analog quantity interface of the second equipment end, thus the communication is effective.

In an embodiment, before the signal converter 910 calculates a pulse number according to the parameter change value and a stored parameter-pulse number relationship function, the signal converter 910 is further configured to acquire a preset parameter change value and a corresponding pulse number stored in the second equipment end, substitutes the preset parameter change value and the corresponding pulse number into a preset relationship expression to generate a parameter-pulse number relationship function, and stores the parameter-pulse number relationship function. In this way, the generated coded signal has high accuracy.

In an embodiment, the first equipment end is a servo driver, and the second equipment end is a numerical control device. The bus signal is a signal fed back by the servo driver through the bus interface after the servo driver receives the working parameter value of the second equipment end, and the working parameter value of the first equipment end includes a displacement.

Figure 10:
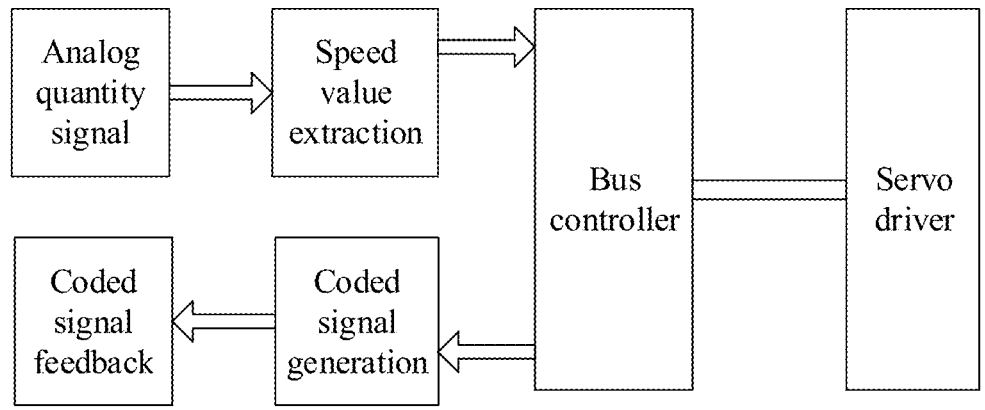
FIG. 10 is a schematic diagram of a bus communication signal conversion process in an application example.
Figure 11:
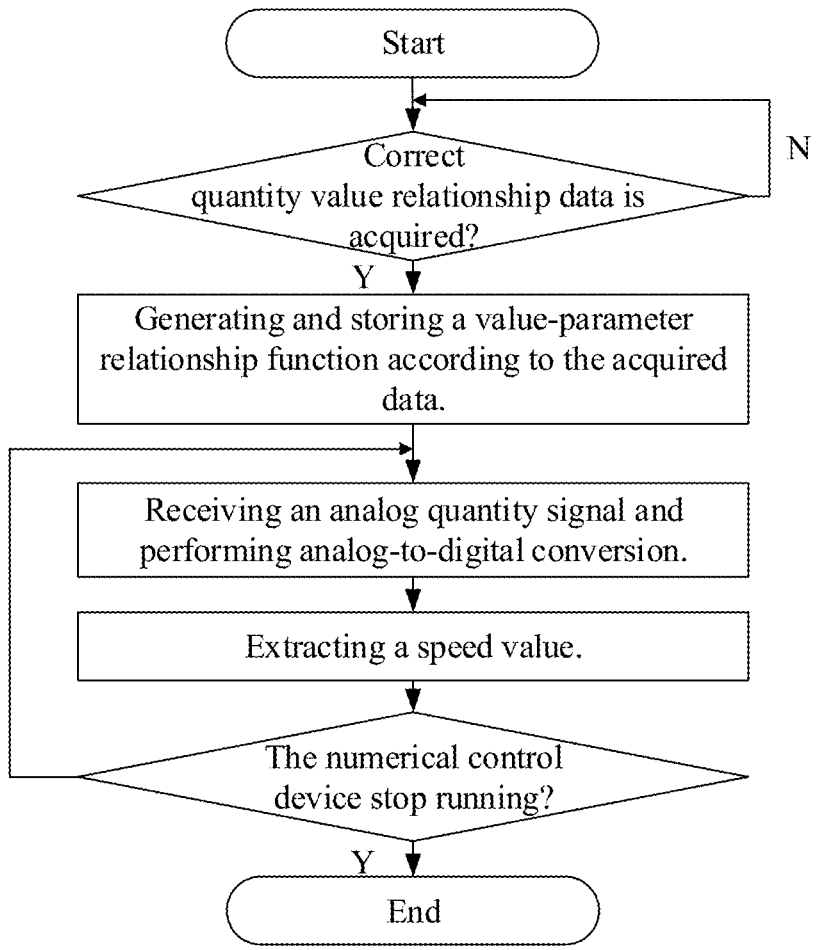
FIG. 11 is a schematic flow chart of extracting a speed value in an application example.
Figure 12:
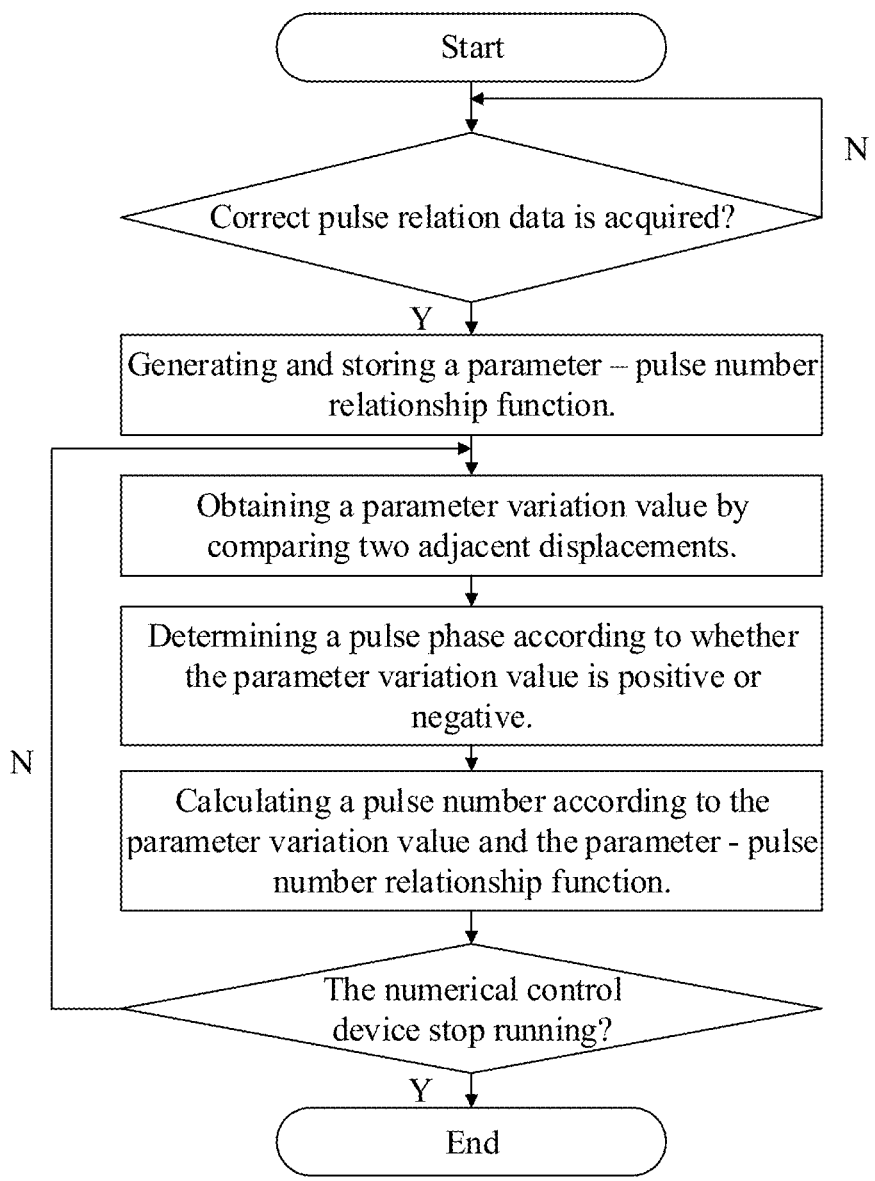
FIG. 12 is a schematic flow chart of generating a coded signal in an application example.

The above bus communication signal conversion method, bus communication signal conversion device, and computer-readable storage medium can be applied to performing signal conversion between a numerical control device and a servo driver. The following takes the first equipment end being a servo driver and the second equipment end being a numerical control device as an example for description. Referring to FIGS. 10 to 12, the working process is as follows:

In the case that both the numerical control device and the servo driver adopt an analog quantity interface for communication, an analog quantity signal output by the numerical control device can be directly transmitted to the servo driver, without signal conversion. A coded signal fed back by the servo driver can also be directly fed back to the numerical control device through the analog quantity interface. When the numerical control device adopts an analog quantity interface for communication and the servo driver adopts a bus interface for communication, first, the bus communication signal conversion device acquires quantity value relationship data from the numerical control device. The quantity value relationship data includes a minimum speed value (minimum parameter value) and a maximum speed value (maximum parameter value) respectively corresponding to each of the analog quantities 0V (minimum quantity value) and 10V (maximum quantity value). The bus communication signal conversion device generates and stores a quantity value-parameter relationship function according to the acquired data. The bus communication signal conversion device receives an analog quantity signal output by the analog interface of the numerical control device, and extracts a speed value from the analog quantity signal according to the quantity value-parameter relationship function, the flow chart is shown in FIG. 11. Then, the bus communication signal conversion device sends the speed value to the bus interface according to a communication protocol to complete the issuance of the speed value. The communication protocol is a communication protocol having an acquired interface type corresponding to the bus interface of the servo driver. Then, the servo driver controls the movement of the servo motor according to the speed value, and sends a bus signal to the bus communication signal conversion device according to an actual displacement of the servo motor. The bus communication signal conversion device parses the bus signal to obtain the displacement, and generates the coded signal according to the displacement, the operation flow is shown in FIG. 12. The bus communication signal conversion device transmits the coded signal to the analog quantity interface of the numerical control device, such that the numerical control device extracts the displacement from the coded signal for closed-loop control.

In an embodiment, a numerical control machine tool control equipment is provided, which includes a bus communication signal conversion device, a numerical control device, and a servo driver. The numerical control device is provided with a communication interface, and the servo driver is provided with a bus interface. The bus communication signal conversion device is connected to the communication interface and the bus interface.

The bus communication signal conversion device acquires an interface type of the bus interface of the servo driver, receives an output signal sent by the communication interface of the numerical control device, and extracts a working parameter value of the numerical control device from the output signal. The bus communication signal conversion device sends the working parameter values of the numerical control device to the bus interface of the servo driver according to a communication protocol corresponding to the interface type.

In the above numerical control machine tool control equipment, since the bus communication signal conversion device is adopted, similarly, the signal conversion can be performed between the numerical control device and the servo driver without changing the designs for the interfaces inside the numerical control device and the servo driver themselves. The numerical control device and the servo driver can be compatible with each other, thereby ensuring the effectiveness of communication.

In an embodiment, the communication interface includes an analog quantity interface, and the output signal includes an analog quantity signal. The bus communication signal conversion device performs analog-to-digital conversion on the analog quantity signal to obtain a digital signal, reads a quantity value corresponding to the digital signal, and calculates a working parameter value of the second equipment end according to the quantity value and the stored quantity value-parameter relationship function. In this way, the signal conversion between the analog quantity interface and the bus interface can be realized, making the communication effective.

In an embodiment, before the bus communication signal conversion device calculates a working parameter value of the second equipment end according to the quantity value and a stored quantity value-parameter relationship function, the bus communication signal conversion device is further configured to acquire a minimum quantity value and a corresponding minimum parameter value, and a maximum quantity value and a corresponding maximum parameter value stored in the second equipment end, and generate a quantity value-parameter relationship function according to the minimum quantity value, the maximum quantity value, the minimum parameter value, the maximum parameter value, and a preset function model, and store the quantity value-parameter relationship function.

In an embodiment, after the bus communication signal conversion device acquires an interface type of the bus interface of the servo driver, the bus communication signal conversion device receives a bus signal sent by the bus interface of the servo driver, parses the bus signal according to a communication protocol corresponding to the interface type to obtain a working parameter value of the servo driver; the bus communication signal conversion device generates an interface signal according to the working parameter value of the servo driver, and sends the interface signal to the communication interface of the numerical control device; the signal type of the interface signal is a signal type supported by the communication interface of the numerical control device.

In this embodiment, through signal conversion, the bus signal sent by the bus interface of the first equipment end can be converted into the signal supported by the communication interface of the second equipment end. There is also no need to change the designs for the interfaces inside the first equipment end and the second equipment end themselves, thereby possess high compatibility and high communication effectiveness.

In an embodiment, the communication interface includes an analog quantity interface, and the interface signal is a coded signal. The bus communication signal conversion device compares the working parameter value of the first equipment end obtained by currently parsing with a working parameter value of the first equipment end obtained by previously parsing to obtain a parameter change value, determines a pulse phase according to whether the parameter change value is positive or negative, calculates a pulse number according to the parameter change value and a stored parameter-pulse number relationship function, and generates the coded signal according to the pulse phase and the pulse number.

In an embodiment, before the bus communication signal conversion device calculates a pulse number according to the parameter change value and a stored parameter-pulse number relationship function, the bus communication signal conversion device is further configured to acquire a preset parameter change value and a corresponding pulse number stored in the second equipment end, substitutes the preset parameter change value and the corresponding pulse number into a preset relationship expression to generate a parameter-pulse number relationship function, and stores the parameter-pulse number relationship function.

In an embodiment, the working parameter value of the numerical control device includes a speed value, and the working parameter value of the servo driver includes a displacement.

The bus communication signal conversion device can be a single device or a device composed of multiple devices. In an embodiment, the bus communication signal conversion device includes a signal converter and a bus controller, the signal converter is connected to the communication interface and the bus controller, and the bus controller is connected to the bus interface.

The signal converter receives an output signal sent by the communication interface of the numerical control device, extracts a working parameter value of the numerical control device from the output signal and sends the working parameter value of the numerical control device to the bus controller. The bus controller acquires an interface type of the bus interface of the servo driver, and after receiving the working parameter value of the numerical control device, sends the working parameter value of the numerical control device to the bus interface of the servo driver according to a communication protocol corresponding to the interface type.

For the specific definitions of the functions of the signal converter and the bus controller, refer to the above descriptions of the signal converter and the bus controller in the bus communication signal conversion device, which will not be repeated here.

Those of ordinary skill in the art may understand that all or part of the processes in the method of the above embodiments may be completed by instructing relevant hardware by the computer program, and the computer program may be stored in a non-transitory computer readable storage medium. When the computer program is executed, the processes of the above methods in the embodiments may be included. Any reference to the memory, storage, database or other media used in various embodiments provided in the present application may include non-volatile and/or volatile memory. The non-transitory memory may include a Read Only Memory (ROM), a Programmable ROM (PROM), an Electrically Programmable ROM (EPROM), an Electrically Erasable Programmable ROM (EEPROM) or a flash memory. The transitory memory may include a Random Access Memory (RAM) or an external cache memory. As illustration rather than limitation, the RAM is available in a variety of forms, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), a Rambus Dynamic RAM (RDRAM), and the like.

The technical features of the above-described embodiments may be combined arbitrarily. To simplify the description, not all possible combinations of the technical features in the above embodiments are described. However, all of the combinations of these technical features should be considered as within the scope of this disclosure, as long as such combinations do not contradict with each other.

The above-described embodiments merely represent several embodiments of the present disclosure, and the descriptions thereof are more specific and detailed, but they should not be construed as limiting the scope of the present disclosure. It should be noted that, several modifications and improvements may be made for those of ordinary skill in the art without departing from the concept of the present disclosure, and these are all within the protection scope of the present disclosure. Therefore, the protection scope of the present disclosure shall be subject to the appended claims.

What is claimed is:

1. A bus communication signal conversion method, comprising:
    acquiring an interface type of a bus interface of a first equipment end;
    receiving an output signal sent by a communication interface of a second equipment end;
    extracting a working parameter value of the second equipment end from the output signal; and
    sending the working parameter value of the second equipment end to the bus interface of the first equipment end according to a communication protocol corresponding to the interface type,
    wherein the communication interface of the second equipment end comprises an analog quantity interface, and the output signal comprises an analog quantity signal; and the extracting a working parameter value of the second equipment end from the output signal comprises:
    performing analog-to-digital conversion on the analog quantity signal to obtain a digital signal;
    reading a quantity value corresponding to the digital signal; and
    calculating a working parameter value of the second equipment end according to the quantity value and a stored quantity value-parameter relationship function.

2. The method according to claim 1, wherein before calculating a working parameter value of the second equipment end according to the quantity value and a stored quantity value-parameter relationship function, the method further comprises:
    acquiring a minimum quantity value and a corresponding minimum parameter value, and a maximum quantity value and a corresponding maximum parameter value stored in the second equipment end; and
    generating a quantity value-parameter relationship function according to the minimum quantity value, the maximum quantity value, the minimum parameter value, the maximum parameter value, and a preset function model, and storing the quantity value-parameter relationship function.

3. The method according to claim 2, wherein the first equipment end is a servo driver, the second equipment end is a numerical control device, and the minimum parameter value, the maximum parameter value and the working parameter value of the second equipment end are each a speed value.

4. The method according to claim 1, wherein after acquiring an interface type of a bus interface of a first equipment end, the method further comprises:
    receiving a bus signal sent by the bus interface of the first equipment end;
    parsing the bus signal according to a communication protocol corresponding to the interface type to obtain a working parameter value of the first equipment end;
    generating an interface signal according to the working parameter value of the first equipment end, the signal type of the interface signal being a signal type supported by the communication interface of the second equipment end; and
    sending the interface signal to the communication interface of the second equipment end.

5. The method according to claim 4, wherein the communication interface of the second equipment end comprises an analog quantity interface, and the interface signal is a coded signal; and the generating an interface signal according to the working parameter value of the first equipment end comprises:
    comparing the working parameter value of the first equipment end obtained by currently parsing with a working parameter value of the first equipment end obtained by previously parsing to obtain a parameter change value;
    determining a pulse phase according to whether the parameter change value is positive or negative;
    calculating a pulse number according to the parameter change value and a stored parameter-pulse number relationship function; and
    generating the coded signal according to the pulse phase and the pulse number.

6. The method according to claim 5, wherein before calculating a pulse number according to the parameter change value and a stored parameter-pulse number relationship function, the method further comprises:
    acquiring a preset parameter change value and a corresponding pulse number stored in the second equipment end; and
    substituting the preset parameter change value and the corresponding pulse number into a preset relationship expression to generate a parameter-pulse number relationship function, and storing the parameter-pulse number relationship function.

7. The method according to claim 4, wherein the first equipment end is a servo driver, and the second equipment end is a numerical control device; and
    the bus signal is a signal fed back by the servo driver through the bus interface after the servo driver receives the working parameter value of the second equipment end, and the working parameter value of the first equipment end includes a displacement.

8. A bus communication signal conversion device, comprising a non-transitory memory and a processor, the non-transitory memory storing a computer program, when the processor executes the computer program, the steps of the method of claim 1 are implemented.

9. The bus communication signal conversion device according to claim 8, wherein when the processor executes the computer program, after the step of acquiring an interface type of a bus interface of a first equipment end is implemented, the following steps are further implemented:
    receiving a bus signal sent by the bus interface of the first equipment end;
    parsing the bus signal according to a communication protocol corresponding to the interface type to obtain a working parameter value of the first equipment end;
    generating an interface signal according to the working parameter value of the first equipment end, the signal type of the interface signal being a signal type supported by the communication interface of the second equipment end; and sending the interface signal to the communication interface of the second equipment end.

10. A non-transitory computer readable storage medium, on which a computer program is stored, wherein, when the computer program is executed by a processor, the steps of the method of claim 1 are implemented.

11. The non-transitory computer readable storage medium according to claim 10, wherein when the computer program is executed by the processor, after the step of acquiring an interface type of a bus interface of a first equipment end is implemented, the following steps are further implemented:

receiving a bus signal sent by the bus interface of the first equipment end;

parsing the bus signal according to a communication protocol corresponding to the interface type to obtain a working parameter value of the first equipment end;

generating an interface signal according to the working parameter value of the first equipment end, the signal type of the interface signal being a signal type supported by the communication interface of the second equipment end; and sending the interface signal to the communication interface of the second equipment end.

12. A bus communication signal conversion device, comprising a signal converter and a bus controller, the signal converter being connected to the bus controller;

the signal converter receiving an output signal sent by a communication interface of a second equipment end, extracting a working parameter value of the second equipment end from the output signal, and sending the working parameter value of the second equipment end to the bus controller;

the bus controller acquiring an interface type of a bus interface of a first equipment end, and after receiving the working parameter value of the second equipment end, sending the working parameter value of the second equipment end to the bus interface of the first equipment end according to a communication protocol corresponding to the interface type, wherein the communication interface of the second equipment end comprises an analog quantity interface, and the output signal comprises an analog quantity signal;

the signal converter performs analog-to-digital conversion on an analog quantity signal to obtain a digital signal, reads a quantity value corresponding to the digital signal, calculates a working parameter value of the second equipment end according to the quantity value and a stored quantity value-parameter relationship function, and sends the working parameter value of the second equipment end to the bus controller.

13. The bus communication signal conversion device according to claim 12, wherein after the bus controller acquires an interface type of a bus interface of the first equipment end, the bus controller receives a bus signal sent by the bus interface of the first equipment end, parses the bus signal according to a communication protocol corresponding to the interface type to obtain a working parameter value of the first equipment end and send the working parameter value of the first equipment end to the signal converter; and the signal converter generates an interface signal according to the working parameter value of the first equipment end, and sends the interface signal to the communication interface of the second equipment end; wherein, the signal type of the interface signal is a signal type supported by the communication interface of the second equipment end.

14. The bus communication signal conversion device according to claim 13, wherein the communication interface of the second equipment end comprises an analog quantity interface, and the interface signal is a coded signal;

the signal converter compares the working parameter value of the first equipment end obtained by currently parsing with a working parameter value of the first equipment end obtained by previously parsing to obtain a parameter change value, determines a pulse phase according to whether the parameter change value is positive or negative, calculates a pulse number according to the parameter change value and a stored parameter-pulse number relationship function, and generates the coded signal according to the pulse phase and the pulse number.

15. The bus communication signal conversion device according to claim 13, wherein the first equipment end is a servo driver, and the second equipment end is a numerical control device; the bus signal is a signal fed back by the servo driver through the bus interface after the servo driver receives the working parameter value of the second equipment end, and the working parameter value of the first equipment end comprises a displacement.

16. A numerical control machine tool control equipment, comprising a bus communication signal conversion device, a numerical control device and a servo driver, the numerical control device being provided with a communication interface, the servo driver being provided with a bus interface, and the bus communication signal conversion device being connected to the communication interface and the bus interface;

the bus communication signal conversion device acquiring an interface type of the bus interface of the servo driver, receiving an output signal sent by the communication interface of the numerical control device, and extracting a working parameter value of the numerical control device from the output signal; and the bus communication signal conversion device sending the working parameter value of the numerical control device to the bus interface of the servo driver according to a communication protocol corresponding to the interface type.

17. The numerical control machine tool control equipment according to claim 16, wherein after the bus communication signal conversion device acquires an interface type of the bus interface of the servo driver, the bus communication signal conversion device receives a bus signal sent by the bus interface of the servo driver, parses the bus signal according to a communication protocol corresponding to the interface type to obtain a working parameter value of the servo driver; and the bus communication signal conversion device generates an interface signal according to the working parameter value of the servo driver, and sends the interface signal to the communication interface of the numerical control device; wherein, a signal type of the interface signal is a signal type supported by the communication interface of the numerical control device.

18. The numerical control machine tool control equipment according to claim 16, wherein the bus communication signal conversion device comprises a signal converter and a bus controller, the signal converter is connected to the communication interface and the bus controller, and the bus controller is connected to the bus interface.

* * * * *